LE DRU R. POMEROY.
AUTOMATIC COIL FORMER.
APPLICATION FILED MAR. 2, 1917.

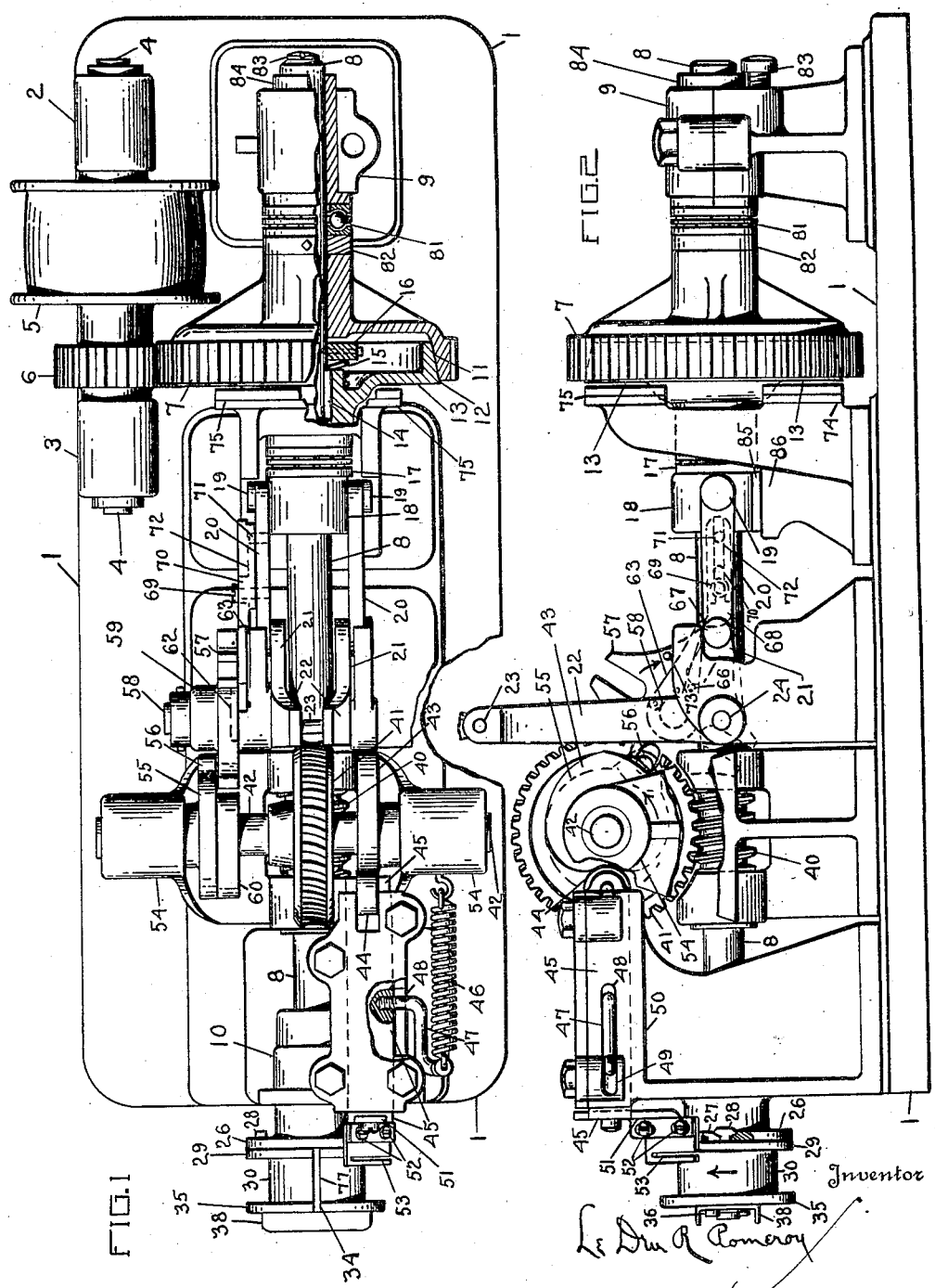

1,402,014.  Patented Jan. 3, 1922.
2 SHEETS—SHEET 2.

Le Dru R Pomeroy, Inventor

By Geo E ____, Attorney

UNITED STATES PATENT OFFICE.

LE DRU R. POMEROY, OF TOLEDO, OHIO.

AUTOMATIC COIL FORMER.

1,402,014. Specification of Letters Patent. Patented Jan. 3, 1922.

Application filed March 2, 1917. Serial No. 151,958.

*To all whom it may concern:*

Be it known that I, LE DRU R. POMEROY, a citizen of the United States of America, residing at Toledo, Lucas County, Ohio, have invented new and useful Automatic Coil Formers, of which the following is a specification.

This invention relates to winding mechanisms.

This invention has utility when incorporated in coil formers, especially in winding determined lengths, say of wire in layers especially adapted for the production of coils for wire ties for bags and sacks.

Referring to the drawings:

Fig. 1 is a plan view with parts broken away, of an embodiment of the invention for wire coils;

Fig. 2 is a side elevation with parts broken away of the device shown in Fig. 1;

Figure 3:
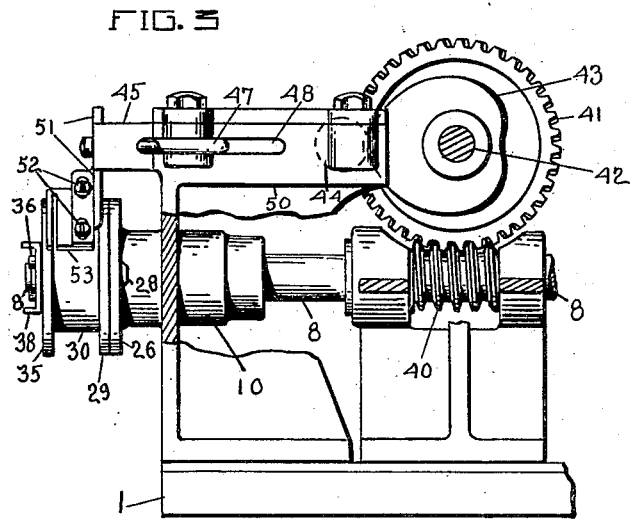
Fig. 3 is a fragmentary side elevation showing the layer guide and its drive.
Figure 6:
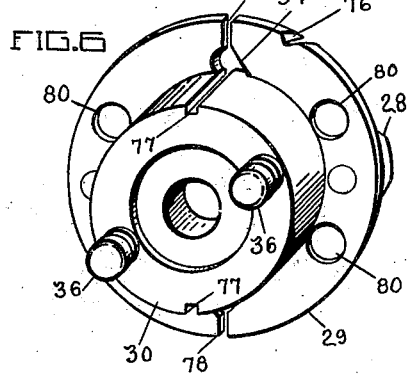
Fig. 6 is a perspective view of the spool with its removable flange away from assembled relation.
Figure 7:
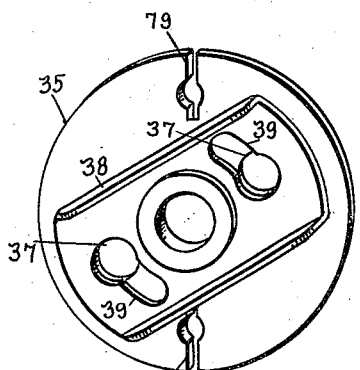
Fig. 7 is a perspective view of the removable flange for the spool of Fig. 6.
Figure 4:
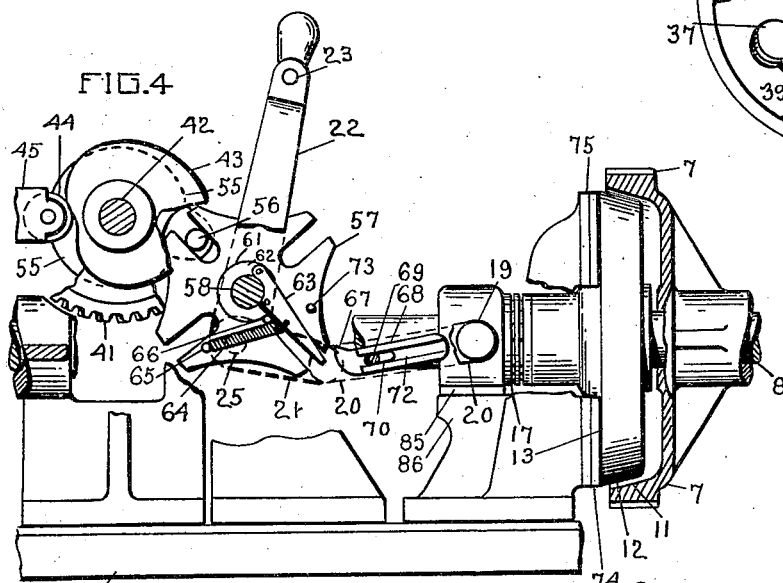
Fig. 4 is a fragmentary side elevation showing the stop device.
Figure 5:
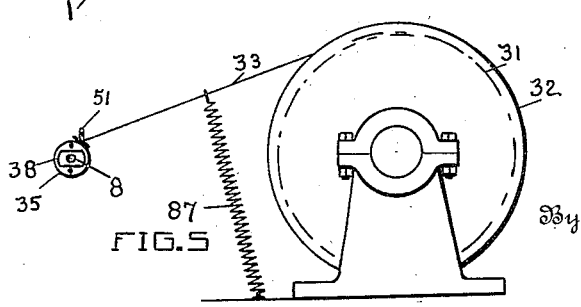
Fig. 5 is a fragmentary view showing the spool receiving supply from a coil.

The coil former may be mounted as a unit upon base plate 1 carrying the bearings 2, 3, for the shaft 4 on which is mounted the pulley 5 to be constantly driven from a source of power whereby the continuously driving pinion 6 may actuate the gear 7 loosely mounted on the shaft 8 parallel to the shaft 4. This shaft 8 is mounted in the bearings 9, 10.

The gear wheel 7 has the conical inner clutch face 11, opposing the conical clutch face 12 of the driving disk 13 connected by spline 14 for rotation with the shaft 8. This clutch member 13 is normally forced out of connecting relation with the gear 7 by the spring 15 acting against the collar 16 fast on the shaft 8.

Opposing the action of this spring 15 is the antifrictional bearing 17 between the member 13 and the collar 18. This collar 18 is provided with the pair of ears 19 connected by the links 20 extending to the arms 21 of the angle levers 22 upwardly extending and connected by the pin 23. These angle levers 21, 22 have the fulcrum pins 24, 25, lying in the plane of the axis of the shaft 8 and in the same plane with the pins 19. There is accordingly provided a toggle joint when the links 20 and arms 21 are brought up slightly above the dead center, thereby automatically holding the clutch member 13 against the action of spring 15 into driving relation with gear 7.

This driving of the shaft 8 rotates the carrier flange 26 having arc recesses 27 therein into which may be thrust the headed pins 28 extending from the flange 29 of the spool 30 when the spool 30 is mounted on the shaft 8, thereby automatically locking this spool to the shaft 8 when the draw of the winding load is applied. This winding load, say from the reel 31 loosely mounted on the freely revoluble holder 32, supplies this strand 33, the end of which may be angularly bent to wedge into the recess 34.

The spool is completed by the detachable flange 35 opposing the flange 29 of the spool 30 which carries the pair of headed pins 36 insertable into the openings 37 in the flange 35. When so inserted in these openings 37 in the flange 35, the relatively movable, axially pivoted plate 38 on this flange 35 may be oscillated to cause the smaller end portions 39 of the slots registering with these openings 37 to come up under the heads of the pins 36. There is thus an angularly movable plate 38 rocked toward the reverse travel or draw of the material to be wound, serving to hold this flange in assembled relation with the spool.

With the wire or strip material locked at this end to wind over the spool or support 30 and this support 30 driven from the shaft 8, the speed reduction device or worm 40 serves to drive the worm wheel 41 on the shaft 42 carrying the heart shaped cam 43 which coacts with the roller 44 mounted in the reciprocable plunger 45. This roller 40 is held against the cam 43 through the action of the spring 46 on bracket 47 protruding through the slot 48 and engaging the plunger 45. Clearance groove 49 is provided in the upstanding support 50 for the reciprocable travel of the bracket 47. This plunger 45 as reciprocated by the cam 43, carries at its opposite end the transversely extending member 51 to which is detachably and adjustably mounted by the screws 52 the slotted guide plate 53 through which the strip material or wire may be directed in its travel to the spool 30.

The speed reduction drive is so proportioned as to the cross section of the material being wound that this guide slot 53 in its reciprocation across the face of spool 30 in the rotation of this spool 30 feeds the material thereto in continuous even layers.

From this speed reduction device and automatically driven during the winding of the coil on the spool is the mechanism for effecting the automatic stop. The shaft 42 above the shaft 8 is carried in the bearings 54. On this shaft 42 on the opposite side of the worm wheel 40 from the cam 43 is the disk 55 carrying the pin 56 for engaging the star wheel 57 mounted on the shaft 58 in the bearing 59 above the plane of the shaft 8. This star wheel is held against travel independently of the pin 56 by the disk 60 fast on the shaft 42. This star wheel 57 has about the shaft 58 an annular recess 61 in which is loosely disposed the disk 62 carrying dog 63 normally held by the spring 64 extending therefrom to the pin 65 on the star wheel 57 to abut the pin 66 on the star wheel 57. Accordingly, for each determined number of rotations of the shaft 8, the cam 43 rotates once to shift the guide 53 for a double layer of wire on the spool. In this instance four double layers of material are supplied to the spool 30 before the free end of the dog 63 comes into contact with the ledge 67.

This ledge 67 is on the member 68, the position of which may be accurately adjusted along the link 20 by the set screw 69 engaging in the slot 70 in this member 68, this member 68 being held from rotation relatively to the link 20 by the pin 71 fast with link 20 and slidable in the guide 72 on the inner face of this member 68. As this dog 63 comes in contact with this ledge 67, the spring 64 allows the dog 63 to move back against the pin 73 in the star wheel 57. Continued movement of the star wheel 57 now means a positive actuation of this dog 63 for breaking the toggle by moving the member 68 downward, the spring 15 at once comes into play to throw member 13 out of clutching relation with the gear 7. This throw brings the disk 13 against non-rotatable opposite, arc-shaped brake shoes 74, 75, causing this member 13 through its spline 14 to stop the shaft 8 practically instantaneously. The supply wire may be cut, the free end of this supply drawn into the notch 76 in the flange 29 of the spool 30, the spool 30 rotated in the opposite direction to the normal travel of the shaft permitting movement of the wedge heads 28 into the recesses 27 so that the spool may be removed axially from the shaft 8. With this spool removed, the binding wire may be inserted in the grooves 77 and lapped through the slots 78, 79, on the flanges 29, 35. These binding wires may be twisted to hold the coil in wrapped position or otherwise effect a locking. The free end of the wire bent into the notch 76 may be engaged in this binding wire and then by angular shifting of the plate 38, the flange 35 may be removed from the spool 30, the introduction of a tool in the openings 80 in the flange 29 may force this coil of wire off the spool 30 and the spool with flange 35 assembled thereon is ready for use.

In practice, extra spools are provided so that the machine may be running upon the immediate replacing of a loaded spool with an empty spool. Upon placing the empty spool on the shaft 8 for angular locking by the backward pull with the wire engaged with the wedge opening 34, all that is necessary for the operator to do is to shift the upper end 22 of the angle levers 21, 22 toward the spool 30, thereby bringing the toggles 20, 21 into position to force the clutch member 13 away from the brake shoes 74, 75 into engagement with gear 7. This thrust action on the shaft 8 together with the worm thrust is taken up by the anti-friction bearing 81 between the collar 82 fast on the shaft 8 and the fixed bearing 9.

It is possible to bring up this re-set device from the stop position of the machine or coil former because upon the tripping of the toggle, the spring 64 has drawn the dog 63 clear of the ledge 67. This means that there is no time lost in idle running or special setting of the machine. The machine can be operated at high speeds for practically continuous operation in that it automatically lays the stock on the spool in a determined quantity and accurately stops the machine as soon as such quantity is supplied so that the operator places the empty spools when the full spools are removed and tilts the lever to re-set the machine for its automatic driving. By adjusting the screw 83 against the sleeve 84, this sleeve may act through bearing 81 and collar 82 to vary the position of the clutch member 7 and accordingly adjust the clutch engagement thrust from the toggles. In the reciprocations of the collar 18 its shoes 85 slide on the fixed guides 86.

That the stopping of the machine may not result in loosening the wire on the spool, spring 87 maintains taut the reach 33 from the coil 32.

What is claimed and it is desired to secure by Letters Patent is:

1. A coil former including rotation counter means for forming a definite coil, a drive disconnecting device for the counting means, and movable actuating mechanism for effecting disconnecting operation of the driver, said mechanism automatically shiftable in its continued forward travel in effecting disconnecting operation to position the device for ready reset thereof, and comprising a rotary mounting having a stop, a dog carried by the mounting, and a spring normally holding the dog away from the stop.

2. A coil former embodying a first rotatable spool-carrying shaft, at an angle thereto a second shaft, speed reduction gearing for actuating the second shaft from the first, eccentric means on said second shaft, a guide reciprocable by the means to direct material to be coiled by the first shaft a layer each way for each rotation of the second shaft, a throw-off device for the first shaft including a third shaft actuable from the second shaft when a determined quantity of material is guided to the first shaft, a driver for the first shaft, and disconnecting means directly actuated by the movement of the third shaft for disconnecting the first shaft from being driven by the driver.

3. A coil former embodying a rotatable coil-carrying shaft, a concentric driver for the shaft, a clutch member slidable on said shaft to engage said driver, toggle links extending along said shaft and movable for shifting the clutch member axially of said shaft in disconnecting the driver from the shaft independently of shifting said shaft or driver, said links forming a toggle one on each side of said shaft, each toggle having a fixed bearing approximating a plane with said shaft and the toggle connection with the clutch member, and a toggle resetting arm mounted in said bearings for simultaneously setting the two toggles.

4. A coil former including a coil carrying shaft, a concentric driver for the shaft loosely mounted thereon, a toggle device spanning the shaft and embodying links extending therealong, a clutch member on said shaft shiftable by the toggle device relatively to the shaft for disconnecting the driver from the shaft independently of shifting the driver, there being a fixed bearing for two of the toggle links, and a rotatable member parallel to the bearings and driven from the shaft for tripping the toggle device.

5. A coil former including a spool carrying shaft, a driving shaft therefor, transmission means between said shafts embodying a clutch comprising a pair of elements, a drive disconnecting device embodying speed reduction mechanism, a toggle for operating a clutch element, a toggle tripping dog, a positive throw stop actuable by the mechanism for shifting the dog, and means normally yieldably holding the dog away from the stop, thereby permitting direct resetting of the tripped toggle.

6. A coil former including a horizontal driving shaft, a coil carrying shaft fixed against lateral movement, a clutch coaxial with the coil carrying shaft and shiftable therealong for connecting and disconnecting said shafts, a horizontally fixed transverse shaft over the coil-carrying shaft, speed reduction gearing for actuating the transverse shaft, and a throw-off for the clutch operable from the transverse shaft and including a pivotal member shiftable by the transverse shaft, thereby to disconnect the clutch.

7. A coil former including a frame, a driver, a coil carrying first shaft, a second shaft actuable from the first shaft for continuous rotation during first shaft operation, a guide reciprocable from the second shaft for directing material in coil forming on the first shaft, a third shaft having intermittent driving actuation from the second shaft, said shafts being fixed against movement as to each other except as to rotation in said frame, a tripping member carried by the third shaft, a clutch between the driver and the first shaft, and clutch setting means shiftable by the tripping member as driven by the third shaft for disconnecting the driver from actuating the second shaft.

In witness whereof I affix my signature.

LE DRU R. POMEROY.